Feb. 7, 1939. J. BIJUR 2,145,854
LUBRICATING INSTALLATION
Filed July 18, 1930 3 Sheets-Sheet 2

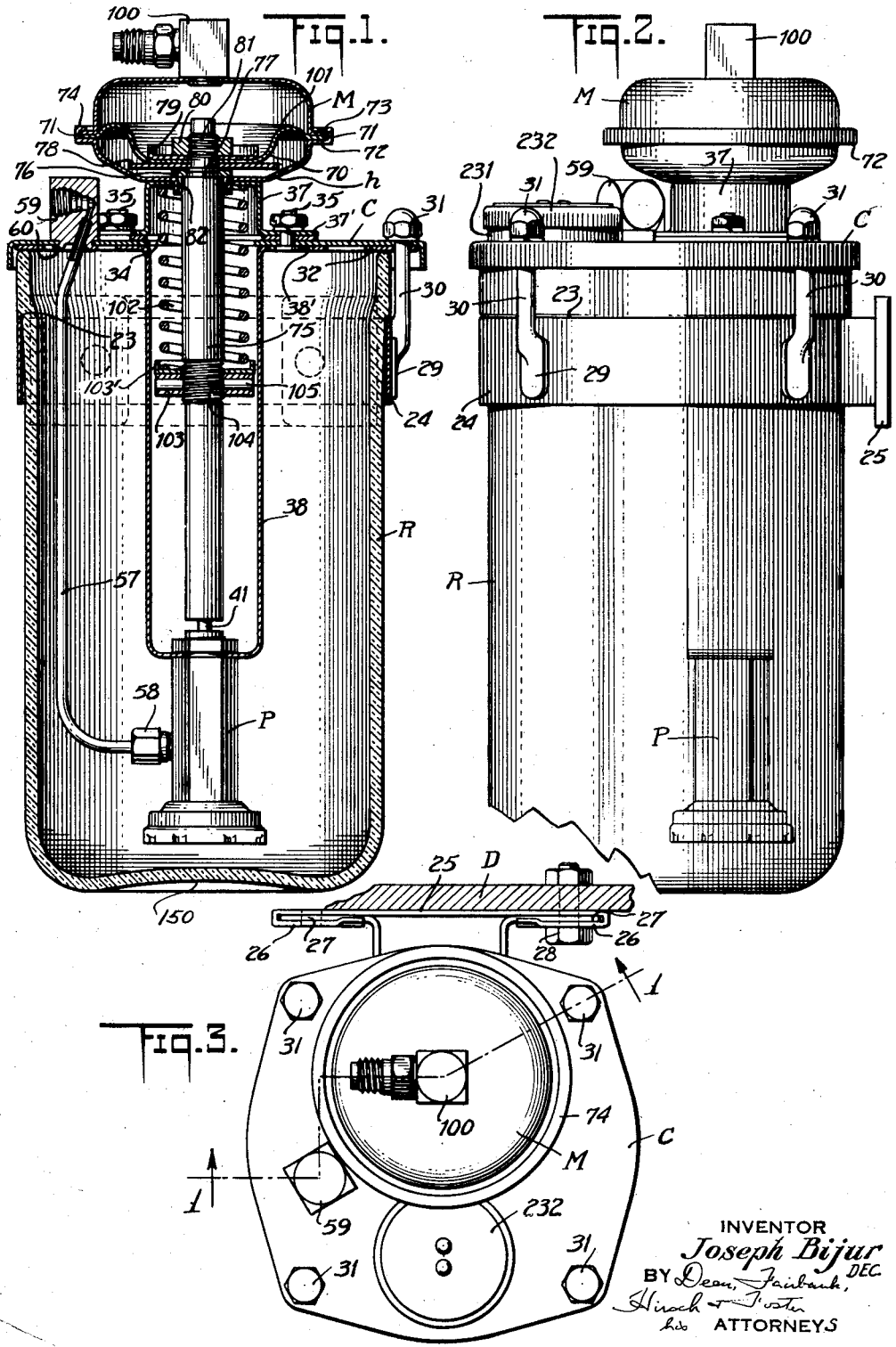

INVENTOR
Joseph Bijur
DEC.
BY
Dean, Fairbank, Hirsch & Foster
his ATTORNEYS

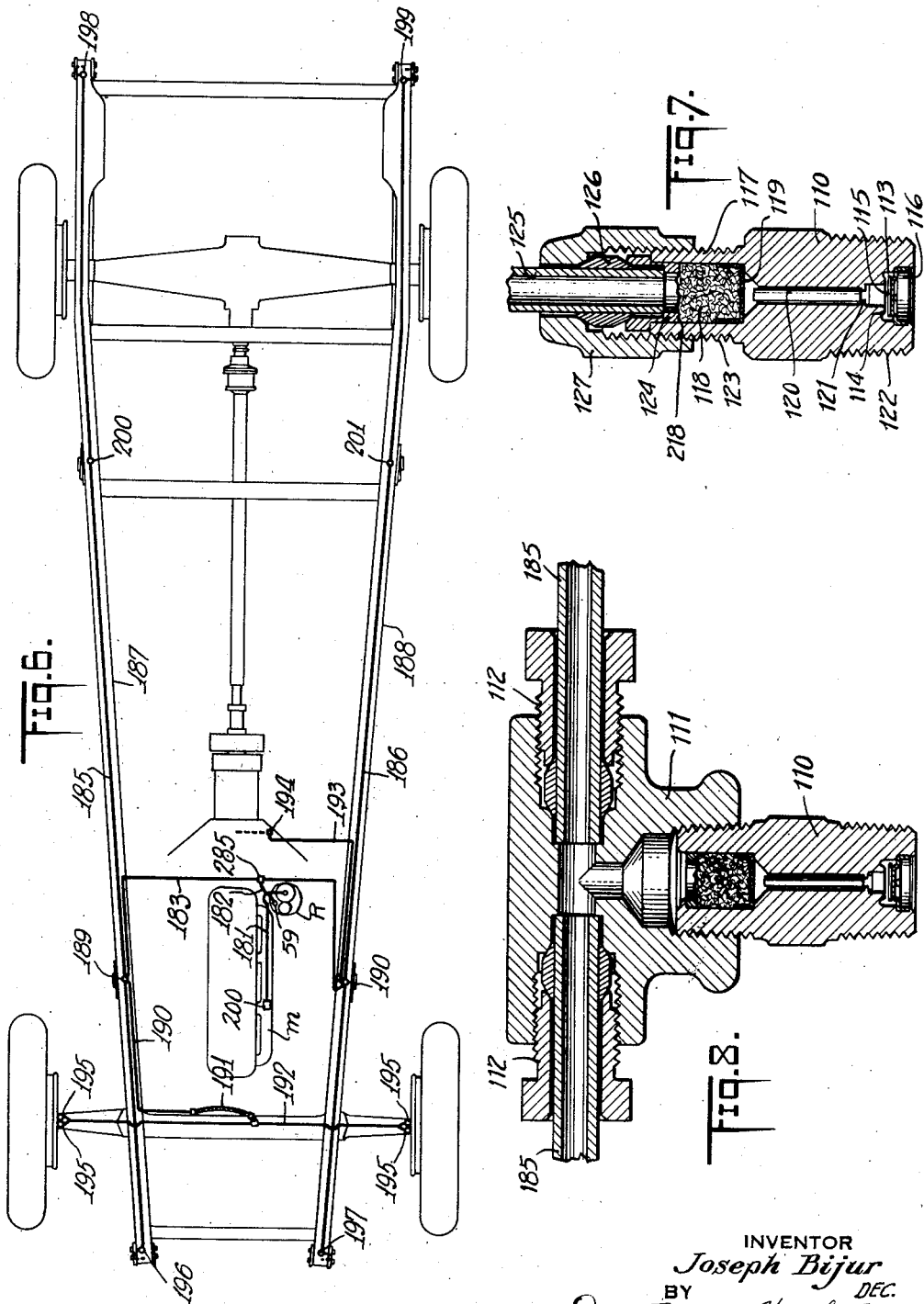

Patented Feb. 7, 1939

2,145,854

UNITED STATES PATENT OFFICE 2,145,854

LUBRICATING INSTALLATION

Joseph Bijur, New York, N. Y., assignor to Auto Research Corporation, a corporation of Delaware Application July 18, 1930, Serial No. 468,790

24 Claims. (Cl. 184—29)

The present invention relates primarily to central chassis lubrication of automobiles and, while not limited thereto, is concerned more especially with systems of the drip plug type, generally claimed and disclosed in the prior Patents Nos. 1,632,771, 1,732,212 and 1,746,139.

It is an object of the invention to effect lubricant propulsion to the chassis bearings, by power already available on the vehicle for other purposes, and to meter the lubricant for substantially correct feed under favorable, as well as under adverse conditions of operation, all with the use of simple rugged mechanism.

Another object is to effect the propulsion of lubricant to the bearings without the need for manual actuation or control, and in accordance with the requirements of each bearing throughout the operation of the vehicle, all without resort to reduction gearing or other mechanical operating or wearing connection with the running mechanism of the vehicle.

Another object is to provide an installation of the above type, utilizing an irregularly varying force generated in operation of the vehicle, preferably suction at the intake manifold, as the primary lubricant propulsive agency, without complication by auxiliary accumulators or trip mechanism, and in which nevertheless lubrication is assured on the one hand under steady or favorable traffic conditions and excessive feed of lubricant is guarded against on the other hand under unfavorable or spasmodically varying traffic conditions.

Another object is to provide a lubricant supply installation universally applicable in a single size without the need for any adjustment to suit the widely varying characteristics of various modern automobiles, and the widely varying conditions of operating the same.

Another object is to provide an installation of the above type of relatively inexpensive construction, with liberal manufacturing tolerance yet with friction losses so low as to insure sensitive response to variations in operative force.

Another object is to provide a lubricant supply installation that affords the advantages of a glass container for ease in ascertaining when to refill, which admits of assembly without placing any substantial fracturing stresses upon the glass and thereby avoids the danger of breakage and of injury to the operator, incurred in cases where the glass container must be screwed into place.

Other objects are in part obvious and in part pointed out hereinafter.

A feature of the invention is the use of a lubricant pump of small volume, preferably a reciprocating pump submerged in a supply of lubricant and actuated by a pulsating motor operated from a source of varying energy, preferably suction at the intake manifold.

In a preferred embodiment the motor consists of an encased diaphragm subjected to suction applied thereto directly from the manifold against the resilient opposition, preferably of a spring. The spring preferably is coiled about the rod through which the diaphragm is connected to the pump plunger, and balances the diaphragm in any of various settings thereof corresponding to sustained suction thereon, of each of various magnitudes incurred during vehicle operation. Preferably the diaphragm has sufficient slack or looseness between its fixed rim and its central stiffened movable portion, as to admit of very ready displacement of the latter, the setting of which is accordingly governed almost entirely by the characteristics of the coil spring which opposes the applied suction. For any substantial increase in suction during operation, as by throttle closing the diaphragm is lifted farther and for material decrease in suction as by opening the throttle the stressed spring relaxes to effect discharge of the pump.

Another feature of the invention is the use of a throttle, preferably a fixed throttle to retard or reduce the effect of frequent violent pulsations of suction incurred under conditions of driving in dense traffic, the throttle preferably comprising a highly restricted passage or fitting in the course of flow between the intake manifold and the diaphragm.

Another feature resides in the lubricant supply which may include a reservoir of glass or other transparent material and is preferably provided with a rim resting upon a support ring affixed to the vehicle, a cover, clamped to the rim, carying the pump mechanism and having a filling cap.

In the accompanying drawings in which are shown one or more of various possible embodiments of the several features of the invention:

Fig. 1 is a view in longitudinal section of one embodiment of lubricant supply installation;

Figs. 2 and 3 show side and top views, respectively, of the same embodiment;

Fig. 6 is a diagrammatic plan of a typical chassis lubricating layout; and

Figs. 7 and 8 show typical flow metering devices or drip plugs.

Figs. 1, 2 and 3 show the reservoir, pump and motor combination, the pump P being enclosed within the reservoir R adjacent the bottom thereof and the motor M being positioned above the reservoir and above the pump, the cap or cover C of the reservoir supporting both the pump and the motor.

Figure 4:
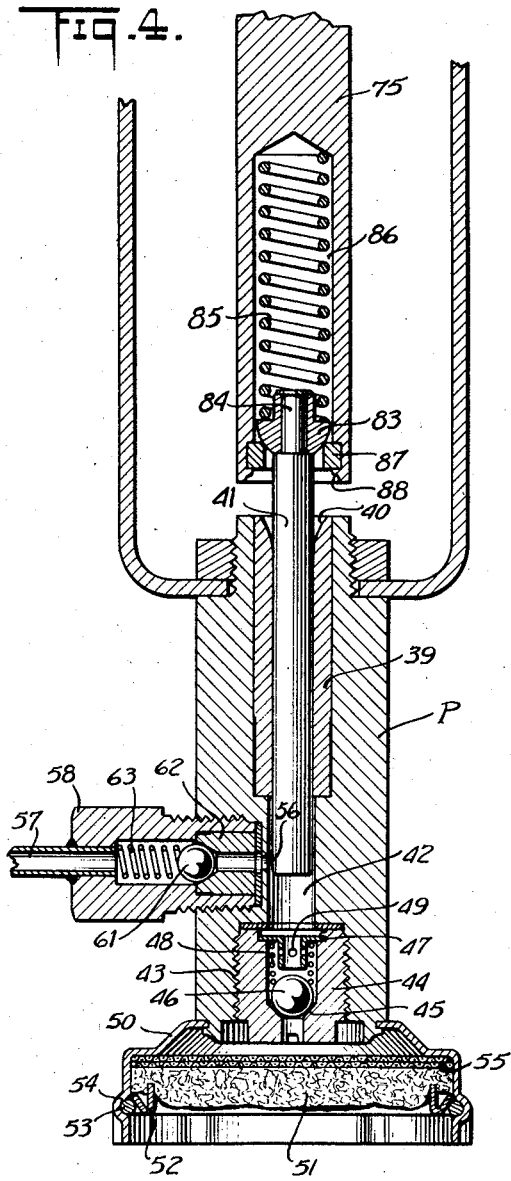
Fig. 4 is a fragmentary view in longitudinal section and on a larger scale showing details of the pumping mechanism.

The cover C is provided with an inlet opening 231 provided with a removable cap 232.

The reservoir R which is preferably of glass has a rim expanded to afford a shoulder 23 for resting upon the carrying strap 24. Strap 24 has an associated bracket 25, the inturned ends 26 of which overlap the outturned ends 27 of the strap, and bolts 28 through the overlapped ends of the strap and bracket serve to affix the latter to the dashboard D or other mount.

To the outside of strap 24 are attached, as by welding or soldering, flattened portions 29 of upstanding bolts 30. The bolts 30 project upwardly through spaced openings near the vertices of squared cover C. Nuts 31 screwed upon the ends of bolts 30 press the cover C firmly against the top of the glass tank and the interposed gasket 32 assures a substantially lubricant-tight fit.

A depending support strap 38 is secured at its ends by spot welding to the underside of cover C to straddle an opening 34 therein. The flange 37', of a support cup 37 for the motor M is secured on top of the cover immediately above the opening 34 by passing over studs 35 that are welded to the cover, and over which clamping nuts 35' are screwed.

The motor unit comprises a capsule M rigidly affixed by welding, for instance, concentrically of the support cup 37. The motor includes a diaphragm 70 clamped at its rim 71 between the base element 72 and the cover element 73 of the motor capsule, the rim of the base element being crimped over that of the cover at 74.

A rod 75 is rigidly affixed centrally of the diaphragm by means including a disk 78 and a cup 79 disposed at opposite faces of the diaphragm and pressed through an interposed washer 76 against shoulder 77 on the rod 75 by means of a nut 80 threaded upon the reduced upper end 81 of said rod. Rod 75 extends with substantial clearance through the flanged opening 82 in the motor base 72 and is connected to the pump plunger 41 by a universal joint comprising a hemispherical fitting 83 rigidly affixed over the reduced end 84 of the plunger. A coil spring 85 in a corresponding deep socket 86 at the lower end of the rod 85 presses the spherical surface of the ball member against a collar 87 retained in place by the inturned lower edge 88 of the hollowed rod and prevents lost motion or rattling between rod 75 and plunger 41. Reasonable tolerance in misalignment between the diaphragm center and the pump are thus permitted, slight flexure of the diaphragm, slight tilting of rod 75 and slight rocking of the universal joint 83 taking up such misalignment, without, however, imposing undue friction on the parts.

Suction is applied in operation as more fully described below, through fitting 100 in the cap 73, the maximum lift being determined by contact of the rod end 81 with the capsule cover 73, in which position the central part of the diaphragm is preferably lifted approximately to the plane of the rim 71. The maximum diaphragm depression is determined by engagement of washer 76 with base 72.

The diaphragm is a disk of diameter sufficiently large to accommodate the range of movement of its central portion for which purpose the extra diameter is taken up in an extra fold 101 near the rim thereof. The central portion of the diaphragm stiffened by disk 78 and cup 79 can thus be displaced through the permitted range without material strain upon the diaphragm material, the loose fold 101 admitting of such relatively free or frictionless movement.

A coil spring 102 encircling the rod, reacts at its upper end against the fixed motor support 37 and at its lower end against a centering cup 103' upon a nut 103 threaded upon the rod. The spring is precompressed for such characteristic as aproximately to retain the diaphragm in balance between the upper and lower limits of diaphragm movement and at levels roughly proportional to suction. In other words, the greater the suction, the greater the compression of the spring and the higher the position of the diaphragm. The nut 103 is initially adjusted in setting up the apparatus for use, to impart correct balance strength to spring 102, and is thereupon locked in position by mutilating the thread 104 by a blow upon a pointed tool inserted through hole 105 in the nut.

Attached to the lower end of the strap 38 to depend therefrom is the cylinder block P. The upper portion of the cylinder block is provided with a socket into which is press fitted a long plunger or piston bearing bushing 39, the upper edge of which is beveled, as indicated at 40, so as to admit of more ready entrance of the small plunger or piston 41. The plunger 41 closely fits the inside of the bearing guide 39, thereby preventing leakage of lubricant therefrom. Below the bearing 39 is the cylinder 42, the wall of which affords a slight gap with respect to the plunger 41. The lower portion of the cylinder block has a tapped socket 43, which receives a removable threaded annular plug 44 provided with a seat 45 for the inlet ball check 46 and enclosing the combined ball check stop 47 and valve spring 48. Stop 47 has a flange staked into plug 44 and a shank perforated at 49 to permit the ready passage of lubricant to the pump, should the ball check 46 be lifted to engage the end of member 47.

To the lower outer edge of the block P is crimped the upper rim of the downwardly facing cup 50, the lower portion of which contains the felt filter disk 51 which is held in position by means of the clamping ring 52, which is in turn held in position by the spring ring 53, in groove 54 of cup 50 and backed by metal screens 55.

For effective venting, the reservoir R is provided with a hole h in motor base 72 which communicates with the reservoir contents through clearance space 82 about rod 75. Plate 78 shields the diaphragm from injury by meddlers. The hole h being at high level will prevent escape of oil, and it serves to permit unimpeded operation of the diaphragm.

The pump ejects through a lateral port 56 in block P into pipe 57 which is affixed to the block by means of a coupling union 58. Pipe 57 leads upward within the reservoir to an outlet block 59 preferably crimped to the cover C at 60 to which is connected the head of the distributing system. The coupling union 58 mounts a ball check valve 61 urged against a seating plug 62 within the coupling union 58, by means of a coil spring 63.

The unit, as shown in Figs. 1 to 4, is particularly suitable as the propulsive mechanism for feeding lubricant to the bearings of an automobile chassis. In Fig. 6 is shown a diagrammatic arrangement of such installation. The reservoir R shown affixed to the dashboard is connected with the intake manifold $m$ by means of a pipe 181 applied to fitting 300. The pump outlet fitting 59 feeds through pipe 182 to junction 285 in cross conduit 183, the opposite ends of which lead, respectively, to junction fittings 189 and 190 on the respective channel frames along which pipes extend to feed the various bearings, including the spring-bolts and shackles. Junction 190 is illustratively shown with an additional outlet leading through pipe 193 to the clutch release collar 194. The junction 189 is shown with an additional outlet feeding a conduit 190 which includes a flexible section 191 and leads to a conduit 192 along the front axle from the ends of which latter conduit steering knuckles 195 are supplied.

In advance of each of the bearing inlets is provided a flow restriction of any of a variety of constructions, a preferred embodiment of which is a drip plug fitting of the general type disclosed in the prior patents above referred to. At the ends or terminals of various lines, for instance at 196 and 198, the drip plug shown in Fig. 7 is used. In the run of the lines, for instance at 200 and 201, a T fitting such as that shown in Fig. 8 is used.

Each T fitting comprises a flow controlling stem 110 having a T head 111 threaded thereon, into the arms of which are secured by appropriate pipe couplings 112 the extremities of the sections that make up the piping mains on the channel frames or other structure.

The drip plug structure of Fig. 7 as well as the stem of Fig. 8 may comprise a fitting 110 having a socket 113 at its outer end conformed as a valve seat 114 with a coacting flap valve 115 retained in place by means of a perforated and embossed cap 116. Into the inlet socket 117 of the fitting is plugged a felt strainer 118 having a backing cup 119 of wire mesh. In the longitudinal bore between the valve and the strainer is disposed a restriction pin 120 maintained by staking at 121 from engagement with the valve. Pins of different diameters are used in accordance with the desired ratings of the fittings, the longitudinal bores of the fittings being identical.

The drip plug is threaded at 122 for application into the bearing and has a threaded inlet end 123 for application thereto of a coupling for effecting pipe connection. The pipe coupling may comprise a thimble 124 telescoped into the socket 118 and serving as a stop for the pipe end 125, and a compression coupling sleeve 126 encircling the pipe end and being forced against the thimble by the coupling cap 127 threaded upon the fitting.

The system being installed on the vehicle, as shown in Fig. 6, and the oil reservoir being charged, the parts remain in the relation shown in Fig. 1 as long as the engine is at rest, the spring 102 maintaining the diaphragm depressed to lowermost position.

During running of the vehicle, suction is applied from the intake manifold to the motor cap 73. Under such suction the central part of diaphragm 70 moves upward, drawing with it the pump rod 75 and the pump plunger 41 and stressing the spring 102. Depending on the degree of suction, which for some vehicles, under some running conditions may be as high as 18 inches of mercury and for other vehicles under other running conditions may be as low as 6 inches of mercury, the spring 102 will be correspondingly compressed to equalize the suction and dispose the diaphragm center at corresponding level. Thus under all usual operating conditions the diaphragm floats at a level varying substantially directly with the suction exerted by the intake manifold.

The diaphragm being in any of various floating positions set forth, when, as by opening the throttle, the pressure becomes more nearly atmospheric, the spring 102 is permitted to expand and thereby to depress the diaphragm 70, consequently urging downward the pump rod 75 and with it the plunger 41 and to urge the small contents of the cylinder into the distributing pipe system.

Thus, regardless of the condition of operation, each material decrease in the manifold suction from any sustained magnitude thereof, due to any of various frequently occurring conditions or vehicle driving manipulations, will bring about discharge of the pump into the distributing line. The pump is discharged solely as a result of variations of manifold suction, regardless of the mean sustained value of such suction. The pump is charged and maintained charged under sustained suction on the diaphragm during the intervals between discharges.

The pumping unit is quite sensitive to small suction variations, for the diaphragm moves with little or no friction and the spring 102 is free from rubbing contact with other parts. On frequent occasions in the ordinary course of vehicle operation, the pump will perform a full stroke, particularly where the throttle is first closed and then opened fairly wide, as in shifting gears and the like. A few of such full strokes are effective to eject into the pipe line any residual air trapped in the pump or above the filter 51, in initially charging the reservoir, which air will escape through the drip plugs of the distributing system and be replaced by oil that completely fills and maintains filled the voids in the pump.

The pump plunger fitting with small clearance in an elongated pump cylinder, leakage is not troublesome and substantially the effective amount of oil in the pump is ejected past the outlet valve 61 into the distributing system. Return of oil through the pump past the inlet valve 46 is prevented, as the spring 48 effectively seats the ball and prevents the return flow of oil in plunger depression, which might otherwise occur, especially when the oil is fairly viscous as in cold weather.

As the small clearance between the end of plunger 41 and the intake valve 46 is completely filled with oil, as above noted, sufficient suction is exerted even in pump strokes as short as $\tfrac{1}{16}$ inch to effect lifting of the valve 46 and drawing in of a charge past filter 51. The relative frequence of operation of the pump during normal vehicle operation, especially in view of the limited resilience of the pipe system results in a more or less sustained pressure therein, to effect more or less continuous delivery by the drip plugs throughout vehicle operation under line pressure adapted to the viscosity of the oil.

When the oil is quite fluid, as in hot weather, the line pressure may be as low as 1 pound, or less, to which the flap valves 113 of the drip plugs will readily respond, while in winter weather, the pressure may rise to 50 pounds per square inch, or more.

Delivery of lubricant through the respective drip plugs will occur at the relative rates determined thereby, the total delivery being determined by the pump. When the vehicle stops, even though the engine be idling, lubrication ceases, any incipient leak through a bearing at low level being checked by the consequent suction of the light flap valves of drip plugs at higher level against their seats. The pipe system thus always remains oil filled.

The filter 51 assures the entry of clean oil to the pump line and tends to shed by gravity foreign particles intercepted by its lower face. Should an improper oil be used and the filter become clogged thereby, the cover with the motor and pump carried thereby are readily removed and the filter withdrawn and cleaned or replaced. The filter thus protects the various strainers and other sensitive parts of the drip plugs shown in Figs. 7 and 8 from derangement due to the use of such improper oil.

While the various elements of the lubricant supply unit may be made in proportions or dimensions suited to the particular use to which the device is put, the application of the device for automobile chassis lubrication renders certain dimensions and proportions peculiarly suitable for universal application to various widely differing makes of automobiles. For such purpose the pump plunger preferably has a cross sectional area of 1/50 square inch, the diaphragm has a diameter of 2 7/16 inches and a stroke of 1/4 inch. The glass tank may have an overall diameter of about 4 1/8 inches and an overall depth of about 7 1/2 inches for the quart size and about 4 7/8 inches for the pint size. The walls when of flint glass are sufficiently strong if 11/64 inch in thickness. The bottom is preferably convex upward, as shown at 150 for convenience in handling prior to installation. In such arrangement spring 85 is preferably under normal stress of three pounds and therefore will transmit a pump pressure up to 150 pounds per square inch. In case of obstruction or the use of very viscous oil this spring when compressed to the limit the apparatus admits of is compressed to a maximum of six pounds in depression of rod 75 over arrested plunger 41, thereby preventing destructive pressure in excess of 300 pounds per sq. inch that might under highly exceptional conditions, otherwise occur, and injure particularly a flexible conduit such as is shown at 191 in Fig. 6. The inlet to the pump being near the bottom of the reservoir, the latter can be almost completely exhausted before refilling becomes imperative. The reservoir is readily refilled after removal of the filling cap and since the cover is spaced a substantial distance above the band 24, the upper end of the reservoir is exposed to view, and the likelihood of filling to overflow is avoided.

Figure 5:
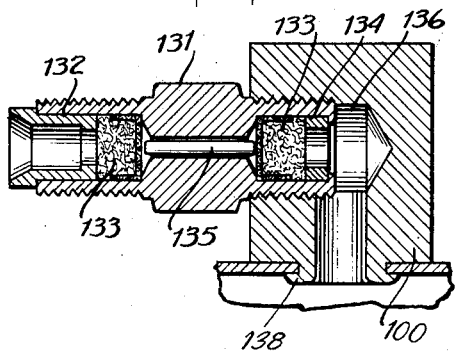
Fig. 5 is a view in longitudinal section of one form of a damping device.

In use of the system, as thus far described, it is apparent that, were the parts so arranged or set as to feed approximately correctly under condition of sustained highway travel, there would be a great excess of lubricant feed under conditions of city driving, where the manifold suction would be varied suddenly and frequently through wide ranges, during the recurrent gear shift and brake operations. To prevent the consequent over-lubrication under such conditions of operation, means is preferably provided automatically to reduce the effectiveness upon the motor M of such sudden changes in suction. For this purpose choke or damper means is preferably interposed in the path of suction application from the manifold m to the motor M. A preferred construction of such choke is shown in Fig. 5 and embodies a fitting 131 generally similar to the drip plug fitting of Fig. 7, but in which protective felt plugs 133 are provided both in the inlet socket 132 and in the outlet socket 134. The restriction pin 135 may be 11/32 inch in length and affords a radial clearance of .002 inch which produces a choking effect equivalent to that of six feet of pipe of 1/32 inch bore. The choke plug is threaded into a socket 136 in the block 100 shown crimped at 138 to the head 73 of the motor M.

Thus, in operation when suction is suddenly applied at the manifold, the air or gas can escape but slowly from the motor head through the choke plug 131 so that before the pressure will have been greatly reduced in the motor, the suction in the manifold will again have become less intense. Thus the variations of suction on the motor are maintained within relatively small ranges notwithstanding sudden and wide variations of suction at the manifold.

The mounting bracket for the reservoir is particularly inexpensive, in that it consists merely of a strap 24 made of stock metal strip amply reinforced by the bracket strip 25 of somewhat heavier and wider stock strip which affords a particular stiff, anti-tilting mounting. The inturned ends of the bracket 25 overlap the outturned ends of the strap 24, which lie against the length of the bracket. The two parts of the mounting are readily assembled together without the need for welding or riveting.

What is claimed as new and desired to secure by Letters Patent, is:

1. A central chassis lubricating system, the lubricant propulsive energy of which is derived from the vacuum in the intake manifold, comprising a conduit system for distributing lubricant to the various bearings, a pumping device supplying lubricant for said conduit system, a pressure responsive device for actuating said pumping device, a fluid line connecting said pressure responsive device with the intake manifold and a continuously open valveless flow restricting device in said line.

2. A liquid-distributing system comprising a source of varying gaseous fluid pressure, a pressure responsive device, a continuously open, valveless highly restricted gaseous fluid conduit from said source of varying pressure to said pressure responsive device, an obstructed liquid distributing system and means to connect said pressure responsive device to said liquid distributing system.

3. A central lubricating system deriving its lubricant propulsive energy from the variation of pressure in the engine intake comprising a lubricant distributing conduit system, a plunger pump, a conduit connecting said diaphragm with said engine intake and a restriction fitting in said conduit including an orifice and filter means cooperating with said orifice to prevent clogging thereof.

4. In combination with a pressure responsive device, a plunger pump and a connecting rod operatively connecting said plunger pump to said device, a resilient and pivotal connection comprising a socket rigid with the end of the connecting rod, a pivotal enlargement upon the end of said plunger in the outer part of said socket, a pivot seat for said enlargement in the outer portion of said socket and a compression spring forcing said enlargement against said seat and compressed between said enlargement and the bottom of the socket.

5. In apparatus of the character described, a glass reservoir having an expanded rim portion, affording a mounting shoulder, a strap adapted to be affixed to a mount to afford a rest and support for said reservoir at said mounting shoulder, a cover for said reservoir, clamping means affixed to said strap and adapted to press said cover upon said reservoir, a pump depending from said cover to near the bottom of said reservoir, a motor affixed to the top of said cover for operating said pump, a filling cap on said cover laterally of said motor, and an outlet pipe from said pump extending upward through said cover.

6. A supply installation for a central chassis lubricating system comprising a glass reservoir, a cover therefor, a lubricant inlet, a pump in said reservoir, a metal strap encircling the reservoir adjacent the top thereof, means for attaching said metal strap to a mounting, upwardly extending bolts rigidly attached to said strap and passing through openings in said cover and means upon the top of said bolts to hold said cover upon the top of said reservoir.

7. A supply installation for a central chassis lubrication system comprising a vertical longitudinal reservoir, a cover therefor, a lubricant inlet, a pump in said reservoir, a mounting bracket for a liquid containing reservoir, said bracket comprising a reservoir encircling strap having outturned ends and a bracket strip in face to face contact with said ends and having its extremities inturned to overlap said ends.

8. In an automatic lubricating apparatus, a container for lubricant, a pump including a piston in the container for ejecting the lubricant, a supply pipe for carrying off the lubricant, connecting said pump and the parts to be lubricated, a differential pressure device fixed to the container, a connecting rod between said pump and said device, pipe means for connecting the device to a source of energy for effecting a pressure difference on opposite sides of said device resulting in movement of the piston during most of its operation, means for equalizing pressure on opposite sides of the device during most of its operation, and for returning the piston to initial position, fluid controlling means arranged at one side of the device for braking movement of the piston, and a connection between the connecting rod and pump piston which automatically operates above a predetermined pressure of lubricant in the supply pipe to prevent the device from operating the piston during the time pressure is above said predetermined minimum.

9. A liquid supply installation comprising a reservoir having a cover, a carrying structure secured to said cover and depending into said reservoir, a pump arrangement carried by said structure, an actuating arrangement secured to said cover above said pump and connecting means affixed to the operative element of said actuating arrangement at one end and to the operative member of said pump at the other.

10. A lubricant supply installation comprising a reservoir, a cover affixed thereto, a carrying means depending downward into said reservoir from said cover, actuating means mounted on said cover, connection means affixing said actuating means and said carrying means rigidly to said cover, a piston pump affixed near the lower end of said carrying means with its lower extremity near the bottom of said reservoir, a connecting arrangement affixed to the actuating means and at the other to the piston of said pump, and an outlet conduit from said pump extending upward within said reservoir through said cover.

11. A pump and reservoir unit for centralized lubricating systems including a cylindrical lubricant reservoir, a cap member for said reservoir, a plunger pump secured to said cap member and located adjacent the bottom of said reservoir, and vacuum operated means mounted on said cap for actuating said pump.

12. In a centralized lubricating system, a pump and reservoir unit comprising a lubricant reservoir, a pressure chamber associated with said reservoir, a movable wall in said chamber, a spring for urging said wall in one direction, a stem secured to said wall and projecting into said reservoir, a high pressure cylinder secured within said reservoir, and a plunger carried by said stem and reciprocable in said cylinder.

13. A pumping arrangement for a lubricant distributing system comprising a motor, a pump for forcing lubricant under pressure into said system, and a connection including a resilient connection between said motor and said pump transmitting power from said motor to said pump, said resilient connection being effective to cause said motor and pump to move rigidly together at predetermined low pressures and being effective to permit movement of said motor without movement of said pump at higher pressures.

14. In a lubricating apparatus of the class described, the combination of a transparent reservoir, a supporting bracket for the reservoir, a cover for the reservoir, a depending supporting member for the pump, a cylinder supported by said member, said cylinder provided with an inlet and an outlet, a strainer interposed between said inlet and said reservoir, an outlet connection carried by said cover, conduit means connecting said outlet connection with said cylinder outlet, a small metallic piston reciprocable in said cylinder and forming a metal to metal seal therewith, a piston rod connected with said piston by a connection permitting relative angular movement, said piston rod extending through said cover, a spring for operating said piston in one direction, and automatic means for operating said piston in the opposite direction.

15. In a combined pump and reservoir unit for a centralized lubricating system, the combination of an open-ended receptacle forming a lubricant reservoir, a cap member for said receptacle having means, associated therewith for securing said receptacle to a support, a small diameter lubricant pump secured to said cap member and disposed adjacent the bottom of said reservoir, a conduit including a passageway through said cap member for connecting the discharge outlet of said lubricant pump to a lubricant distributing system, a motor for operating said pump carried by said cap member on the upper side thereof, and an operating member universally connecting said motor with said pump for actuating the same.

16. In a combined pump and reservoir unit for a centralized chassis lubricating system, the combination of a transparent receptacle forming a lubricant reservoir, a cap therefor, a laterally extending bracket securing said receptacle and cap to a support, a member dependingly affixed to said cap carrying a pump cylinder at its lower end adjacent the bottom of said receptacle, said member constituting the sole support for said cylinder, a motor affixed to the upper side of said cap, a small diameter plunger reciprocable in said cylinder, an operating member universally connecting said motor to said plunger for discharging lubricant from said pump cylinder, and a conduit for conveying the lubricant discharged from said pump cylinder to a lubricant distributing system.

17. A pump installation for centralized lubricating systems comprising a cup-shaped glass bowl forming a lubricant reservoir, a cap secured thereto, means for securing said reservoir and cap to a support, motivating means carried by said cap and extending above said reservoir, a pump including a cylinder having an inlet and an outlet port, said pump cylinder being rigidly supported by said cap and located adjacent the bottom of said reservoir, a plunger reciprocable in said pump cylinder, an operating member universally connecting said motivating means and said plunger, a filter carried by said pump cylinder and disposed between the inlet port and the lubricant in said reservoir, and a conduit connected to the discharge port of said cylinder and passing through said cap for conveying lubricant from said pump to a lubricant distributing system.

18. In a combined pump and reservoir unit for a centralized lubricating system, of the class described, the combination of a glass reservoir, a top therefor, means for attaching said top to said reservoir, a laterally extending bracket for attaching said reservoir and top to a support, operating means carried by said top, said operating means including a small pump located adjacent the bottom of said reservoir, a motor extending above said top and means connecting said pump with said motor, said top having a substantially centrally located opening through which part of said operating means extends, said motor including a spring and means for adjusting the tension thereof, a strainer associated with said pump, and a discharge conduit for said pump leading upwardly therefrom to a point above said glass reservoir.

19. In a combined pump and reservoir unit for a centralized lubricating system, the combination of an open-ended receptacle forming a lubricant reservoir, a member overlying the open end of said receptacle, means for attaching said member to said receptacle, a bracket for carrying said member and said receptacle, a pump unit depending from said member and located adjacent the bottom of said reservoir, said pump unit including a cylinder, a small rod-like plunger reciprocable therein, and inlet and outlet ports, a strainer for said inlet port, said member having a passageway therethrough, a pipe connecting said outlet port with said passageway, a motor supported by said member and extending thereabove, and a connection between said pump and said motor.

20. In a combined pump and reservoir unit for a centralized lubricating system, the combination of an open-ended transparent receptacle forming a lubricant reservoir, a member overlying the open end of said receptacle, means for detachably attaching said member to said receptacle, a bracket for carrying said member and said receptacle, a support depending from said member, a pump unit carried at the lower end of said support and located adjacent the bottom of said reservoir, said pump unit including a cylinder, a small diameter plunger reciprocable therein, and inlet and outlet ports, a strainer supported adjacent said inlet port, a check valve for said outlet port, said member having a passageway therethrough terminating in a fitting adapted for connection to the conduit of a centralized lubricating system, a pipe connecting said outlet port with said passageway, a motor carried by said member and extending thereabove, said motor including a reciprocable element and a spring tending to move said element in one direction, a universally flexible connection between said motor and said plunger, said member having a filling opening therethrough, and a cover normally closing said opening.

21. In an automobile chassis drip plug lubricating installation, a pump and reservoir unit having a reservoir enclosure provided with a covering upper wall having an inlet opening for lubricant, a reciprocating automatically actuated motor including a motor element floating during operation and a coil spring opposing movement of said floating element in one direction, a thin cylindrical elongated metallic plunger, a casing for said motor element located above the lubricant level in said reservoir enclosure and above said upper wall, and a pump block with a vertical cylindrical bore receiving said plunger located closely adjacent the bottom of said enclosure, said motor element and said plunger being directly operatively connected together so that said motor element will move said plunger both upwardly and downwardly to respectively take charging and discharging strokes, said connection being by a connecting rod extending down through said covering upper wall having a universal connection with respect to said plunger, said cylindrical bore being provided with a lower portion into which lubricant is sucked from said reservoir upon upward motion of the plunger and from which it is discharged upon downward motion of the plunger into the piping system and also with an upper portion serving as a guide for the plunger and further being provided with inlet and outlet ports, one of which extends transversely toward said lower portion and the other of which extends longitudinally from said lower portion, the outlet port being provided with a spring-seated outlet check valve and the inlet port being provided with a filter element, said plunger being located in said bore with its lower end adjacent said lower portion of said bore in a predetermined position, said plunger during its effective charging and discharging strokes moving upwardly and downwardly synchronized and in phase with the upward and downward movements of the element.

22. A liquid supply installation comprising a reservoir having a cover, a carrying structure of open construction secured to said cover and depending into said reservoir, a pump block carried by said structure, a fluid pressure operated motor secured to said cover in alignment with said pump and a connecting rod affixed to the operative element of said motor at one end and to the operative member of said pump at the other.

23. A lubricant supply installation comprising a reservoir, a cover affixed thereto, a carrying strap depending downward into said reservoir from said cover, a motor in alignment therewith mounted on top of said cover, means affixing said motor and said carrying strap rigidly to said cover, a pump block affixed near the lower end of said carrying strap with its lower extremity near the bottom of said reservoir, a connecting rod affixed at one end to the operating member of said motor and at the other to the operating member of said pump, and an outlet conduit from said pump block extending upward within said reservoir through said cover.

24. In an automotive vehicle of the type having an engine, an intake manifold having a substantial vacuum continuously varying during operation of the vehicle and a chassis lubricating system; a continuous lubricant pump comprising a piston, a cylinder receiving said piston, a motor actuating said piston, said motor including a diaphragm and upper and lower stops for limiting movement of the diaphragm, a conduit to establish communication between one side of said diaphragm and said intake manifold at all times during operation of the vehicle, another conduit to establish communication between the other side of said diaphragm and the atmosphere at all times, a spring to act upon said diaphragm to move it in a direction opposite to that in which it is moved by said vacuum, said spring being of such a character as to balance said diaphragm against said vacuum in a floating position removed from the said upper and lower stops during most of the operation of the vehicle, said diaphragm being so balanced that variations and fluctuations in said vacuum normally will cause a fluttering of the diaphragm above and below an average position and will cause a rapid and frequent reciprocation of said piston with resultant nearly continuous feeding of lubricant to said chassis lubricating system during operation of the vehicle.

JOSEPH BIJUR.